Patented Apr. 17, 1923.

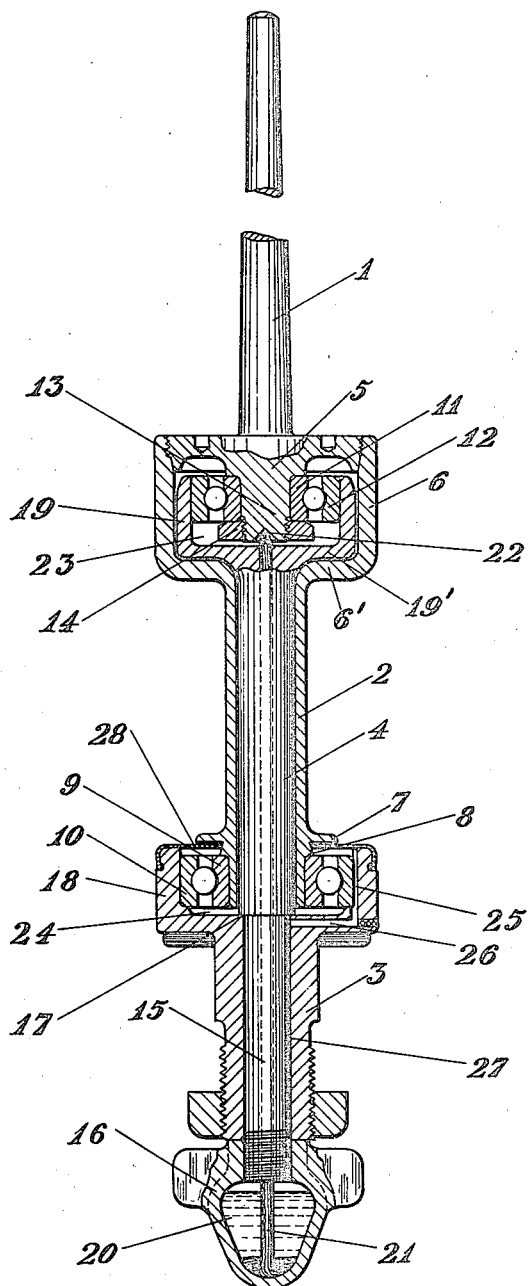

1,452,180

UNITED STATES PATENT OFFICE.

HAROLD E. BRUNNER, OF LARCHMONT, NEW YORK, ASSIGNOR TO THE HESS-BRIGHT MANUFACTURING COMPANY, A CORPORATION OF DELAWARE.

SPINNING SPINDLE.

Application filed November 14, 1919. Serial No. 337,973.

*To all whom it may concern:*

Be it known that I, HAROLD E. BRUNNER, a citizen of the United States, residing at Larchmont, in the county of Westchester and State of New York, have invented certain new and useful Improvements in Spinning Spindles, of which the following is a specification, reference being had therein to the accompanying drawing.

This invention relates to textile spindles employed in spinning, and in the illustrated form is particularly well adapted for use in silk spindles, the object of the invention being to permit the introduction of ball bearings between the driving pulley or whorl which is fast with and rotates the blade, and the supporting arbor or stationary base in such manner that these bearings shall function properly and be safeguarded against injuries resulting from the rough handling which is incidental to the use of such spindles.

In order to appreciate some of the problems confronting the change from plain bearings to ball bearings, the working conditions of the spindles must be kept well in mind. The factor of prime importance being the restricted space allotted to each spindle and the small pulley or whorl diameter prescribed by custom. Among the advantages to be derived from ball bearing mountings for spinning spindles is the greatly increased permitted speed of rotation. As most of the textile mills have cheap power, the conservation resulting from this change of the form of bearings is not such an important factor as is the increase of output from a given number of spindles and in enabling all the spinning frames in the mill to be run at the same and maximum speed.

The drawing accompanying this specification shows in elevation and partly central section a practicable embodiment of a form of my invention.

To enable ball bearings to properly function and to demonstrate their power of endurance when the supported parts are rotated at relatively high speeds it is desirable that the race rings be so mounted in respect of the stationary support and the rotary part that the outer ring shall remain substantially stationary and the inner ring be fast with the rotary part. In the present illustration the bobbin carrying blade 1 and the whorl or pulley 2 make up the rotary part, and the base 3 and arbor 4 constitute a standard for supporting the rotary part and make up the stationary part. That is the standard is normally stationary, for when the spindle is in use the base is of course clamped to the frame in a well known manner. The bond between the blade and whorl is shown as a head rigid with the blade and having a pipe thread connection with an enlarged flange 6 at the upper end of the whorl. The belt engaging face of the whorl is the narrow waist portion to which the reference character 2 is connected by a leader line. The lower end of the whorl is shown formed with a belt positioning flange 7, and a shoulder 8 located above a reduced portion forming a seat for a ball bearing inner ring. In the illustrated spindle there are two ball bearings shown of the deep groove, combined radial and thrust type, the inner and outer rings of the lower bearing being respectively designated by the reference characters 9 and 10 and those of the upper by 11 and 12. The inner rings of this pair of bearings are fast with the rotary part, and according to the prevailing ball bearing practice each is assumed to have a drive fit on its seat. The inner ring 9 of the lower bearing is at the lower end of the whorl and abuts the shoulder 8, and the inner ring 11 of the upper bearing is at the upper end of the whorl and mounted on a hub 13 depending from the blade head 5. This hub is substantially in axial alignment with the blade 1 and arbor 4 and is located within the chamber formed by the whorl flange 6. A nut 14 is shown for steadying and holding the bearing ring 11 in position.

The arbor 4 has an extension 15 of reduced diameter fitting into the bore of the base 3, in which it is held by a wing nut 16 engaging the lower end of the base 3, and drawing the shoulder formed at the upper end of the portion 15 against the upper face of the body portion of the base, at 17. The standard is shown provided with two upwardly directed flanges, one of these, 18, being formed at the upper end of the base 3 and the other 19, at the upper end of the arbor 4, and disposed within the chamber of the whorl flange 6. These flanges 18 and 19, are, it will be seen, parts of the stationary portion of the spindle, and within which are respectively mounted the outer race rings, 10 and 12, of the bearings, such rings having a sucking fit to permit creeping according to the present approved practice of mounting bearings. The ring 10 engages a shoulder at its bottom to limit its downward movement. The lower bearing supports the axial load, the upper bearing being free to float incident to expansion and contraction of the parts.

The structure above described makes it possible to employ ball bearings in which there is preferably a distinct inner and outer ring which are mounted on other parts of the structure, and in which the pitch circle of the ball bearing, that is, a circle touching the centers of all the balls, is of larger diameter than is the diameter of the belt engaging portion of the whorl.

The lubrication of high speed mechanism becomes a formidable problem, when, as in the spinning of textiles, parts requiring lubrication are located immediately adjacent parts designed to carry easily soiled fabric. My present improvement not only causes the ball bearings to properly function but also solves the problem of lubrication in an efficient manner.

The oil reservoir 20 is shown formed in the nut 16. Some suitable device for raising the oil to the upper bearing is employed, a capillary system, as for instance the well known form of wick 21 having been found convenient. The lower faces of the blade hub 13 and the nut 14 run preferably, quite close to the face of the upper end of the arbor adjacent the point of emergence of the wick, a depression 22 being formed in the hub, to accommodate the protruding wick end. The oil as it exudes from the wick is wiped off by the hub and thrown outwardly into the chamber 23 by centrifugal force. It then rises through the space between the bearing rings 11 and 12, passes over the edge of the flange 19 and descends in the space between the whorl and arbor to the chamber 24, rises through the space between the bearing rings 9 and 10 and descends through the channels 25, 26 and 27 to the oil reservoir 20. The chamber within the base flange 18 is provided with a closure 28, extending inwardly and well under the belt postioning flange 7. The escape of oil at this point is practically negligible, and this highest possible point of oil escape is a long way from the silk carrying blade 1.
The upper ball bearing is completely housed in a chamber closed in all directions except downwardly, and in the excepted direction the closure is also complete but for the well guarded oil passages.
The space between the flanges 6 and 19 and their connecting webs 6' and 19' is preferably quite narrow. The nearness of the faces of these parts under normal running conditions serves to safeguard the bearings from the shocks incident to the violent manner in which the bobbins are frequently removed from the blades by the attendants striking the lower face of the bobbin at one side a heavy blow with a stout stick of hard wood, to knock the bobbin loose from the tapering blade upon which it has been too tightly seated. The impact of this blow tilts the blade and whorl sidewise and causes the flanges 6 and 19 and webs 6' and 19' to come into engagement at the side receiving the blow, thereby taking the strain of the shock off the upper bearing.

It is to be understood that the spindle shown in the drawing is illustrative of my invention and that changes may be made as occasion demands within the scope of the claims, without departing from the spirit of my invention.

I claim as my invention:

1. In a spinning spindle, the combination with a rotary blade, of a normally stationary base, a normally stationary standard carried by the base and in axial alignment with the blade, a whorl surrounding the standard and fast with the blade, the whorl having a belt receiving portion, and a pair of ball bearings comprising inner and outer rings, the inner rings whereof being mounted on the whorl above and below the belt receiving portion and the outer rings being carried by the stationary portions of the device, the said belt receiving portion of the whorl being of less diameter than the diameter of the pitch circle of the ball bearings.

2. In a spinning spindle, the combination with a rotary blade, of an arbor having at its upper end a flange, a whorl surrounding the arbor and having at its upper end a flange surrounding the arbor flange and fast with the blade, there being a hub fast with the blade and whorl and depending into the arbor flange, a ball bearing comprising inner and outer rings the inner ring being mounted on the said hub and the outer ring being mounted within the arbor flange, and a ball bearing disposed between the arbor and the whorl at the lower portion of the latter.

3. In a spinning spindle, the combination with a rotary blade, of a base and arbor carried thereby constituting a normally stationary standard, said standard having upwardly directed flanges adjacent the upper and lower ends of the arbor, a whorl surrounding the said arbor and having at its upper end a flange surrounding the standard flange and fast with the blade, its lower end depending into the lower standard flange, there being a hub fast with the blade and whorl and depending into the upper standard flange, a ball bearing having its outer ring mounted within the upper standard flange and its inner ring fast with said hub, and a ball bearing having its outer ring mounted within the lower standard flange and having its inner ring fast with the depending end of the whorl.

4. In a spinning spindle, the combination with a rotary blade, of an arbor in alignment with the blade and having at its upper end a web and an upwardly directed flange, a whorl surrounding the arbor and having at its upper end a web in close proximity to the arbor web and an upwardly directed flange closely surrounding the arbor flange and fast with the blade, there being a hub fast with the blade and whorl and depending into the arbor flange and terminating therein above the upper end of the arbor, and a ball bearing, the inner race being carried by the hub and the outer race being located within the arbor flange.

5. In a spinning spindle, the combination with a rotary blade, of a base, an arbor carried thereby constituting a normally stationary standard, said standard having adjacent the upper and lower ends of the arbor a web and an upwardly directed flange, a whorl surrounding the said arbor, and having at its upper end a web in close proximity to the arbor web, and an upwardly directed flange closely surrounding the upper flange of the standard and fast with the blade, there being hubs fast with the blade and whorl depending into and ending within the respective housings afforded by the arbor flanges, ball bearing inner races carried by the said hubs, ball bearing outer races located within the arbor flanges, and balls between the said races.

6. In a spinning spindle, the combination with a rotary blade, of a base and arbor carried thereby constituting a normally stationary standard, said standard having upwardly directed flanges adjacent the upper and lower ends of the arbor, a whorl surrounding the said arbor and having at its upper end a flange surrounding the standard flange and fast with the blade, its lower end depending into the lower standard flange, there being a hub fast with the blade and whorl and depending into the upper standard flange, a ball bearing having its outer ring mounted within the upper standard flange and its inner ring fast with said hub, and a ball bearing having its outer ring mounted within the lower standard flange and having its inner ring fast with the depending end of the whorl, whereby the inner rings of the ball bearings rotate with the rotary parts of the device and the outer rings of such bearings remain substantially stationary with the stationary parts.

7. In a spinning spindle, the combination with a rotary blade, of a base, an arbor carried thereby constituting a normally stationary standard, said standard having adjacent the upper and lower ends of the arbor a web and an upwardly directed flange, a whorl surrounding the said arbor, and having at its upper end a web in close proximity to the arbor web, and an upwardly directed flange closely surrounding the upper flange of the standard, and fast with the blade, there being hubs fast with the blade and whorl depending into the arbor flanges, ball bearing inner races carried by the said hubs, ball bearing outer races located within the arbor flanges, balls between the said races, an oil reservoir at the bottom of the standard, the arbor being provided with a wick channel, and a wick located therein, the lower portion of the blade being formed as a flinger running adjacent the upper portion of the wick channel.

8. In a spinning spindle, the combination with a normally upright arbor having a main shaft or body portion surmounted by a radially disposed web and an upwardly directed flange carried by the web, of a whorl surrounding the body portion of the arbor and having a radially disposed web closely underlying the web of the arbor and an upwardly directed flange carried by the web and closely surrounding the flange of the arbor, a blade connected to the whorl flange and disposed in alignment with the arbor, the lower end of the blade extending into the housing formed by the arbor flange and terminating therein above the upper end of the arbor, and an anti-friction bearing mounted between the blade extension and the arbor flange.

9. In a spinning spindle, the combination with a normally upright arbor having a main shaft or body provided at its upper portion with a radially disposed web, and an upwardly directed flange carried by such web, of a whorl surrounding the body portion of the arbor and having at its upper portion a radially disposed web closely underlying the web of the arbor and an upwardly directed flange carried by such web and closely surrounding the said flange of the arbor, a blade connected to the whorl, the lower end of the blade extending into the housing formed by the arbor flange and there terminating. the arbor also having immediately below the whorl a radially disposed web and an upwardly directed flange carried thereby, the whorl extending into the housing formed by the lower arbor flange and there terminating, and ball bearings mounted between the respective arbor flanges and the said blade and whorl extensions.

In testimony whereof, I have affixed my signature hereto.

HAROLD E. BRUNNER.